(12) United States Patent
Ding et al.

(10) Patent No.: US 11,486,227 B2
(45) Date of Patent: Nov. 1, 2022

(54) RESERVOIR ISOLATION VALVE FOR SECONDARY COMPLETION

(71) Applicant: Southwest Petroleum University, Sichuan (CN)

(72) Inventors: Liangliang Ding, Sichuan (CN); Wenkang Chen, Sichuan (CN); Hongtao Liu, Sichuan (CN); Qiang Zhang, Sichuan (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 17/515,676

(22) Filed: Nov. 1, 2021

(65) Prior Publication Data
US 2022/0049578 A1 Feb. 17, 2022

(30) Foreign Application Priority Data
Aug. 10, 2021 (CN) .......................... 202110915693.7

(51) Int. Cl.
*E21B 33/124* (2006.01)
*E21B 34/14* (2006.01)

(52) U.S. Cl.
CPC ............ *E21B 34/14* (2013.01); *E21B 33/124* (2013.01); *E21B 2200/04* (2020.05)

(58) Field of Classification Search
CPC ..... E21B 33/124; E21B 34/14; E21B 2200/04
See application file for complete search history.

(56) References Cited

U.S. PATENT DOCUMENTS

| | | | | |
|---|---|---|---|---|
| 10,550,667 | B2* | 2/2020 | Rushing | .................. E21B 34/14 |
| 11,193,351 | B2* | 12/2021 | Moyes | ..................... E21B 34/08 |
| 2021/0388694 | A1* | 12/2021 | Elston | ...................... E21B 34/14 |

FOREIGN PATENT DOCUMENTS

| | | |
|---|---|---|
| CN | 201679983 U | 12/2010 |
| CN | 202047789 U | 11/2011 |

* cited by examiner

*Primary Examiner* — Matthew R Buck
(74) *Attorney, Agent, or Firm* — Wayne IP LLC

(57) ABSTRACT

Disclosed herein is a reservoir isolation valve for secondary completion, which includes a shell assembly, a sleeve assembly arranged in the shell assembly, a reset spring arranged between the shell assembly and the sleeve assembly, a movable tube, an inner limit tube, an outer limit tube, an outer bearing socket, an inner bearing socket, a thrust bearing, a ball valve arranged in the sleeve assembly, a stepped shaft fixed on the ball valve, a transmission mechanism configured for connecting the movable tube to the stepped shaft and allowing the stepped shaft to rotate and a startup part.

9 Claims, 16 Drawing Sheets

RESERVOIR ISOLATION VALVE FOR SECONDARY COMPLETION

CROSS-REFERENCE TO RELATED APPLICATIONS

This application claims the benefit of priority from Chinese Patent Application No. 202110915693.7, filed on Aug. 10, 2021. The content of the aforementioned application, including any intervening amendments thereto, is incorporated herein by reference in its entirety.

TECHNICAL FIELD

This application relates to reservoir isolation valves, and more particularly to a reservoir isolation valve for a secondary completion.

BACKGROUND

Exploratory wells are usually discarded after investigations. In order to reduce the cost of oil and gas exploration, the exploratory wells are temporarily reserved on site, and then converted into production wells, so as to largely reduce the expenditure. A second completion is required in the conversion to the production well. During the secondary completion, operations such as well killing and string lifting are required, and reservoir isolation valves are needed for isolating the reservoir to avoid polluting the stratum. Generally, multiple reservoirs are retained; however, the stratum pressure and permeability of the multiple reservoirs are different, hindering the integrated operation of the exploration. Therefore, a reservoir isolation valve is required to effectively isolate a high-pressure stratum and a low-pressure stratum.

Currently, the mechanical reservoir isolation valve mainly includes a flap-type reservoir isolation valve, such as the reservoir isolation valve disclosed in Chinese patent No. 202047789 U, and a connecting rod-type reservoir isolation valve disclosed in Chinese patent No. 201679983 U. However, when such reservoir isolation valves are being opened, the ball valve is hard to rotate due to the pressure difference between the upper and lower layers of the ball valve, failing to smoothly open the channel in the ball valve. Meanwhile, under the high pressure at the well bottom, vulnerable parts such as the linkage mechanism have a poor bearing capacity and transmission accuracy. The existing reservoir isolation valves have complicated switching operations and low reliability, which may lead to the open failure or pack failure, and blocks the smooth development of the oil reservoir. Therefore, it is urgent to develop a new type of reservoir isolation valve for the secondary completion with large bearing capacity, reliable structure, high transmission accuracy, so as to ensure the normal closing and opening of the ball valve.

SUMMARY

An objective of the present disclosure is to provide a reservoir isolation valve for a secondary completion, so as to ensure the reliability and integrity of a ball valve switch and avoid the easy failure of a plate shaft of the existing reservoir isolation valve. The reservoir isolation valve provided herein simplifies the opening and closing operations, improves the reliability and reduces the relating risks such as opening failure and sealing failure in the reservoir exploitation.

In order to achieve the objective mentioned above, the present disclosure provides a reservoir isolation valve for a secondary completion, comprising:

a shell assembly;
a sleeve assembly arranged in the shell assembly;
a reset spring arranged between the shell assembly and the sleeve assembly;
a movable tube;
an inner limit tube;
an outer limit tube;
an outer bearing socket;
an inner bearing socket;
a thrust bearing;
a ball valve arranged in the sleeve assembly;
a stepped shaft fixed on the ball valve;
a transmission mechanism configured for connecting the movable tube to the stepped shaft and allowing the stepped shaft to rotate; and
a startup part;

the shell assembly and the sleeve assembly are both provided with a through cavity; two ends of the sleeve assembly are limited in two ends of the shell assembly, respectively; a through channel is arranged in the startup part; the shell assembly, the sleeve assembly, the startup part and the ball valve are arranged coaxially; an inner wall of an upper end of the shell assembly is of a circular truncated cone-shaped structure with an inner diameter increasing from bottom to top; the circular truncated cone-shaped structure is provided with an internal thread; part of an inner wall of the through cavity of the sleeve assembly is spherical; the ball valve abuts against the spherical inner wall of the through cavity of the sleeve assembly; the ball valve is a sphere with four perpendicular planes; and centers of the four perpendicular planes are on the same circle;

one end of the stepped shaft passes through a side wall of the sleeve assembly and is rotatably connected to the side wall of the sleeve assembly; the end of the stepped shaft is fixed on the ball valve; and the other end of the stepped shaft is rotatably arranged on an inner wall of the shell assembly;

two ends of the reset spring are limited between the inner wall of the shell assembly and a lower end surface of the movable tube; the movable tube, the inner limit tube and the inner bearing socket are sequentially sleeved on the sleeve assembly; an upper end of the movable tube faces a lower end of the inner limit tube; an upper end of the inner limit tube is connected to a lower end of the inner bearing socket through a thrust bearing; an upper end of the inner bearing socket is limited on the inner wall of the shell assembly; the inner bearing socket is slidably along the sleeve assembly; an inner wall of the inner bearing socket is provided with a first sliding block; a side wall of the startup part is provided with a first shaft shoulder; the startup part is inserted into an upper end of the sleeve assembly; and the first shaft shoulder abuts against the first sliding block of the inner bearing socket;

the outer limit tube and the outer bearing socket are sleeved on the inner limit tube and the inner bearing socket; a lower end of the outer limit tube is limited on the upper end of the movable tube; the outer bearing socket is limited on the inner wall of the shell assembly; and the outer limit tube is connected to the outer bearing socket through the thrust bearing;

an inner diameter of the sleeve assembly below the ball valve is smaller than an inner diameter of the sleeve assembly above the ball valve; part of an inner wall of the sleeve assembly provided with the ball valve is of a hemispherical structure matching the ball valve; a cavity of a connection between the sleeve assembly and the movable tube is a cylinder with two parallel planes;

a side wall of an upper end of the movable tube is provided with a protrusion; the inner wall of the shell assembly is provided with a first limit slot matching the protrusion; the protrusion is slidable along the first limit slot; the movable tube is in clearance fit with the sleeve assembly; a side wall of a lower end of the movable tube is provided with a sliding slot; the stepped shaft is inserted into the sliding slot; and the stepped shaft is movable along the sliding slot;

the upper end of the movable tube is provided with a wedge-shaped limit block corresponding to the protrusion; the inner limit tube is sleeved on the sleeve assembly; the lower end of the inner limit tube is provided with a tooth structure matching the wedge-shaped limit block; the outer limit tube is sleeved on the inner limit tube; a terminal end of the lower end of the outer limit tube is provided with a second limit slot matching the wedge-shaped limit block; a side wall of the lower end of the outer limit tube is provided with a third limit slot; a side wall of the inner limit tube is provided with a second sliding block matching the third limit slot; and the second sliding block is slidable in the third limit slot;

when the reservoir isolation valve is in a closed state, the wedge-shaped limit block of the movable tube and the second sliding block of the inner limit tube are both in the third limit slot of the outer limit tube; and when the reservoir isolation valve is in an open state, the wedge-shaped limit block of the movable tube is limited in the second limit slot; and the second sliding block of the inner limit tube is in the third limit slot of the outer limit tube.

In some embodiments, the transmission mechanism comprises a spur rack and a spur gear; a welding surface is provided on a side wall of the lower end of the movable tube; a first sliding slot is arranged between the welding surface and a lower end surface of the movable tube; the spur rack is arranged on the welding surface; the spur gear is fixed on a side wall of the stepped shaft; and the spur gear is engaged with the spur rack.

In some embodiments, a connection between the stepped shaft and the spur gear is provided with a second shaft shoulder; and a connection between the stepped shaft and a lower shell of the shell assembly is provided with a third shaft shoulder; a connection between the stepped shaft and a lower sleeve assembly of the sleeve assembly is provided with a first sliding bearing; and a connection between the stepped shaft and the lower shell of is provided with a second sliding bearing.

In some embodiments, the side wall of the stepped shaft is provided with a key slot configured for mounting the spur gear; and the spur gear is fixedly connected to the stepped shaft through a flat key and the key slot.

In some embodiments, a rectangular slot is arranged on a plane of the ball valve; an end of the stepped shaft is provided with a rectangular protrusion; and the rectangular protrusion is connected to the rectangular slot of the ball valve.

In some embodiments, the shell assembly comprises a lower joint, a lower shell, a second shell, a retaining ring and a second joint; wherein the lower joint, the lower shell, the second shell, the retaining ring and the second joint are threadedly connected in sequence; the lower joint, the lower shell, the second shell, the retaining ring and the second joint are arranged coaxially; and the lower joint, the lower shell, the second shell, the retaining ring and the second joint are all provided with a through cavity; an inner wall of an upper end of the lower shell is provided with the first limit slot; an inner wall of a lower end of the lower shell is provided with a raised ring; the reset spring is arranged between the lower end surface of the movable tube and the raised ring; a side wall of the lower shell is provided with a threaded through hole corresponding to the stepped shaft; and a locking screw is threadedly connected in the threaded through hole; an inner wall of the retaining ring is provided with a first positioning step and a second positioning step; a terminal end of the upper end of the inner bearing socket matches the first positioning step; and the upper end of the sleeve assembly abuts against the second positioning step.

In some embodiments, the sleeve assembly comprises a lower sleeve, a connecting part and an upper sleeve; wherein the lower sleeve, the connecting part and the upper sleeve are connected in sequence; and the lower sleeve and the connecting part are arranged in the through cavity of the lower shell; the lower sleeve, the connecting part and the upper sleeve are arranged coaxially; the lower sleeve, the connecting part and the upper sleeve all provided with a through cavity; the upper sleeve is arranged in the through cavities of the lower shell and the second shell; a lower end of the lower sleeve and an upper end of the upper sleeve abut against an upper end of the lower joint and the second positioning step of the retaining ring, respectively; a lower end of the connecting part abuts against an upper end of the lower sleeve; and an upper end of the connecting part is threadedly connected to a lower end of the upper sleeve; the upper sleeve is inserted into the inner limit tube and the inner bearing socket; the movable tube is arranged in a gap between the lower sleeve, the connecting part, the upper sleeve and the lower shell; and the movable tube forms a clearance fit with the lower sleeve; an inner diameter of a first cavity of a lower end of the lower sleeve is larger than an inner diameter of a second cavity of the upper end of the lower sleeve; an inner wall of a connection between the first cavity and the second cavity is provided with a hemispherical structure matching the ball valve; the second cavity is a cylinder with two parallel flat planes; a flat plane of the second cavity of the lower sleeve is provided with a through hole matching the stepped shaft; the stepped shaft passes through the through hole; a first limiting bear is limit at a connection between the stepped shaft and the through hole; and the lower end of the movable tube is provided with a cavity matching the second cavity of the lower sleeve; a side wall of the upper end of the upper sleeve is provided with a second sliding slot matching the first sliding block; and the first sliding block is movable in the second sliding slot.

In some embodiments, the upper end of the lower joint and a lower end of the second shell are both provided with an external thread; both ends of the lower shell are provided with an internal thread matching the lower joint and the second shell, respectively; an upper end of the second shell and a lower end of the second joint are both provided with an internal thread; both ends of the retaining ring are provided with an external thread to match the internal thread of the second shell and the internal thread of the second joint, respectively; and an inner wall of an upper end of the second joint of a circular truncated cone-shaped structure; and the upper end of the connecting part is provided with an external thread; and the lower end of the upper sleeve is provided with an internal thread matching the external thread of the connecting part.

In some embodiments, the hemispherical structure of the lower sleeve, an end surface of the lower sleeve in contact with the lower joint, and an inner wall of the movable tube in contact with the lower sleeve are all provided with a seal sleeve; a first annular groove is provided on an inner wall of a lower end of the outer bearing socket; a second annular groove is provided on an end surface of an upper end of the outer bearing socket; an inner wall of the lower end of the inner bearing socket is provided with a mounting groove; and the seal sleeve, the first annular groove, the second annular groove and the mounting groove are all provided with a seal ring.

The beneficial effects of the present disclosure are described as follows.

(1) A reservoir isolation valve for a secondary completion realizes a rotation of a ball valve through a shell assembly, a sleeve assembly, a reset spring, a movable tube, an inner limit tube, an outer limit tube, an outer bearing socket, an inner bearing socket and a thrust bearing. The switching operation is simple and reliable.

(2) In the reservoir isolation valve, a spur rack and a spur gear work as a rack and pinion mechanism to cooperate with the ball valve, so as to control the opening and closing of the reservoir isolation valve. The strong bearing capacity of the rack and pinion mechanism enables the reservoir isolation valve to be applied to high-pressure pipelines. The high transmission accuracy ensures the angle accuracy of the reservoir isolation valve during the opening and closing. In addition, the structure of the rack and pinion mechanism is simple, which is convenient to maintain and reduces the failure rate of the reservoir isolation valve.

(3) A symmetrical design of the rack and pinion mechanism allows a stepped shaft and the ball valve to be balanced in force. When one half of the rack and pinion mechanism fails, the other half of the rack and pinion mechanism can drive the ball valve to rotate, so as to realize the emergency closing of the reservoir isolation valve. The operations for opening and closing the reservoir isolation valve are the same, avoiding the easy failure of the plate shaft in existing reservoir isolation valves. The reservoir isolation valve provided herein simplifies the opening and closing operations, improves the reliability and reduces the relating risks in the reservoir exploitation, and can meet the enterprise needs in production and application.

Figure 1:
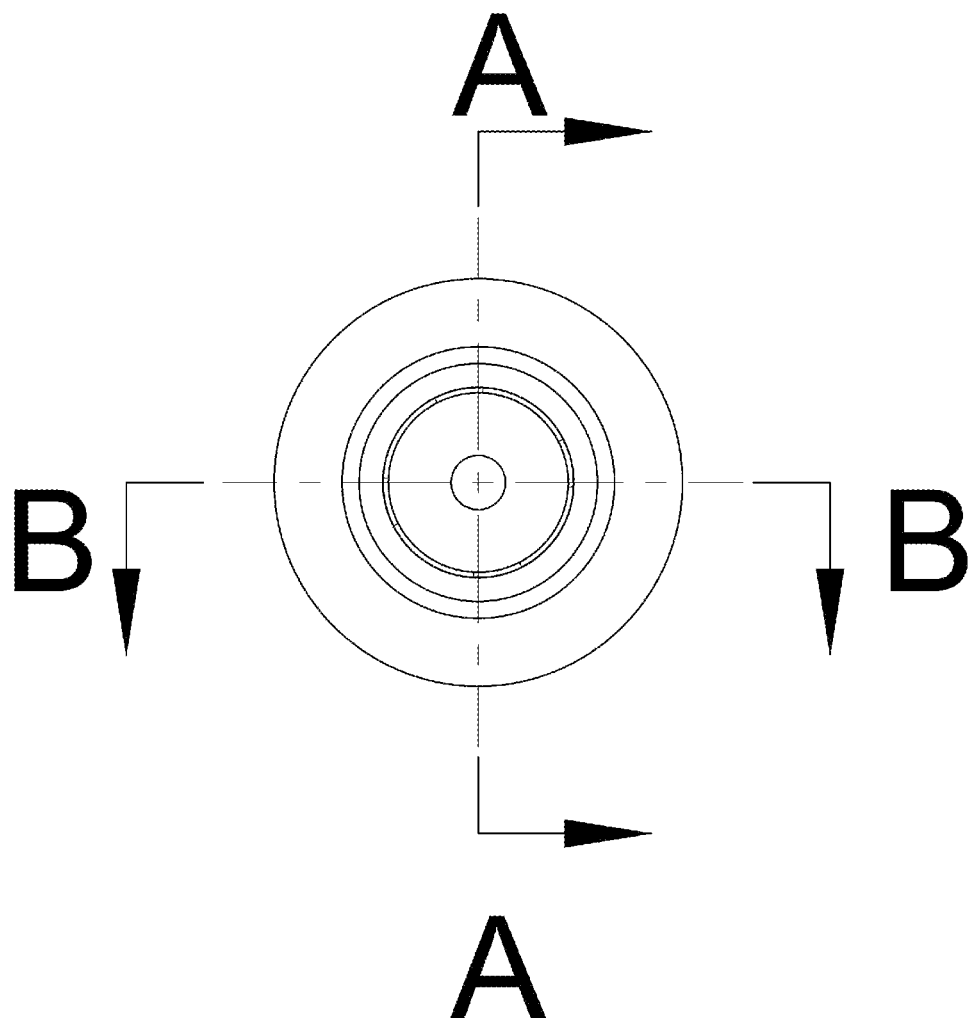
FIG. 1 is a top view of a reservoir isolation valve for a secondary completion according to an embodiment of the present disclosure.

In the drawings, 1, lower joint; 2, lower shell; 3, lower sleeve; 4, reset spring; 5, movable tube; 6, ball valve; 7, connecting part; 8, upper shell; 9, inner limit tube; 10, upper sleeve; 11, outer bearing socket; 12, inner bearing socket; 13, retaining ring; 14, upper joint; 15, startup part; 16, seal ring; 17, spur gear; 18, first sliding bearing; 19, locking screw; 20, second sliding bearing; 21, stepped shaft; 22, spur rack; 23, outer limit tube; 24, flat key; 25, thrust bearing; 26, raised ring; 27, threaded through hole; 28, second limit slot; 29, internal thread; 30, through hole; 31, hemispherical structure; 32, seal groove; 33, flat plane; 34, welding surface; 35, wedge-shaped limit block; 36, protrusion; 37, first sliding slot; 38, flow channel; 39, rectangular slot; 40, external thread; 41, internal thread; 42, tooth structure; 43, second sliding block; 44, second sliding slot; 45, connecting thread; 46, second annular groove; 47, first annular groove; 48, first sliding block; 49, mounting groove; 50, external thread; 51, external thread; 52, positioning step; 53, circular truncated cone-shaped structure; 54, internal thread; 55, third shaft shoulder; 56, channel; 57, rectangular protrusion; 58, first shaft shoulder; 59, second shaft shoulder; 60, key slot; 61, first limit slot; 62, third limit slot; 63, vertex position; 64, end point; and 65, vertex.

DETAILED DESCRIPTION OF EMBODIMENTS

Technical solutions of the present disclosure will be described clearly and completely below with reference to the embodiments. Obviously, provided herein are merely some embodiments of this disclosure, which are not intended to limit the disclosure. Other embodiments made by those skilled in the art without sparing creative work should fall within the scope of the present disclosure.

Embodiment 1

As shown in FIGS. 1-27, a reservoir isolation valve for a secondary completion includes a lower joint 1, a lower shell 2, a lower sleeve 3, a reset spring 4, a movable tube 5, a ball valve 6, a connecting part 7, an upper shell 8, an inner limit tube 9, an upper sleeve 10, an outer bearing socket 11, an inner bearing socket 12, a retaining ring 13, an upper joint 14, a startup part 15, a seal ring 16, a spur gear 17, a first sliding bearing 18, a locking screw 19, a second sliding bearing 20, a stepped shaft 21, a spur rack 22, an outer limit tube 23, a flat key 24 and a thrust bearing 25.

Both ends of the lower shell 2 are provided with an internal thread 29. A lower end of the upper shell 8 is provided with an external thread 40, and an upper end of the upper shell 8 is provided with an internal thread 41. Two ends of the retaining ring are provided with an external thread 50 and an external thread 51, respectively. A lower end of the upper joint 14 is provided with an internal thread 54. An upper end of the lower joint 1 is threadedly connected to a lower end of the lower shell 2. The lower end of the upper shell 8 is threadedly connected to an upper end of the lower shell 2. The upper end of the upper shell 8 is threadedly connected to a lower end of the retaining ring 13. An upper end of the retaining ring 13 is threadedly connected to the lower end of the upper joint 14. The lower joint 1, the lower shell 2, the upper shell 8, the retaining ring 13 and the upper joint 14 are arranged coaxially. The lower joint 1, the lower shell 2, the upper shell 8, the retaining ring 13 and the upper joint 14 are all provided with a through cavity. The startup part 15 is inserted in the upper shell 8, the retaining ring 13 and the upper joint 14. The startup part 15 is movable, and does not need to be connected to other parts. A through channel 56 is arranged in the startup part 15, such that when the startup part 15 is inserted downward, a fluid inside a pipe flows normally, reducing the resistance of running the startup part 15.

The lower sleeve 3 and the connecting part 7 are arranged in the cavity of the lower shell 2. The upper sleeve 10 is arranged in the cavity of the lower shell 2 and the upper shell 8. The connecting part 7 is arranged between the lower sleeve 3 and the upper sleeve 10. Two ends of the lower sleeve 3 abut against the connecting part 7 and the lower joint 1, respectively. The lower sleeve 3 is clamped by the connecting part 7 and the lower joint 1. The lower sleeve 3, the connecting part 7, the upper sleeve 10 and the lower joint 1 are arranged coaxially. The lower sleeve 3, the connecting part 7 and the upper sleeve 10 are provided with a through cavity. A lower end of the lower sleeve 3 abuts against the upper end of the lower joint 1, and an upper end of the lower sleeve 3 abuts against a lower end of the connecting part 7. The lower end of the connecting part 7 abuts against an upper end of the connecting part 7, and the lower end of the connecting part abuts against the retaining ring 13. The upper sleeve 10 is limited by an internal positioning step on the retaining ring 13 and cooperates with the connecting part 7, the lower sleeve 3, and the lower joint 1 to realize clamping.

A positioning step 52 is arranged on an inner wall of the retaining ring 13, and is configured to limit the upper sleeve 10. The retaining ring 13 and the upper shell 8 form a threaded seal structure to protect internal components of the reservoir isolation valve.

Part of an inner wall of the cavity of the lower sleeve 3 is spherical. The ball valve 6 abuts against the spherical inner wall of the cavity of the lower sleeve 3.

The movable tube 5 is arranged in a gap between the lower sleeve 3, the connecting part 7, the upper sleeve 10 and the lower shell 2, and forms a clearance fit with the lower sleeve 3. An inner wall of a lower end of the upper sleeve 10 is provided with a connecting thread 45, and is threadedly connected to the connecting part 7 through the connecting thread 45, so to realize the penetration and sealing of an internal flow channel. An inner wall of the lower end of the lower shell 2 is provided with a raised ring 26. A reset spring 4 is arranged between a lower end of the movable tube 5 and the raised ring 26. The reset spring 4 is clamped through the raised ring 26 of the lower shell 2 and an end surface of the movable tube 5. An inner wall of the upper end of the lower shell 2 is provided with a limit slot 28. An outer wall of the movable tube 5 is provided with a protrusion 36. The protrusion 36 is slidably arranged in the limit slot 28, such that the movable tube 5 is axially slidable.

A welding surface 34 is provided on a side wall of the lower end of the movable tube 5, and the spur rack 22 is welded on the welding surface 34. A first sliding slot 37 is provided on the side wall of the lower end of the movable tube 5, and is between terminal end of the lower end of the movable tube 5 and the welding surface 34. The stepped shaft 21 is movably arranged in the first sliding slot 37. A through hole 30 is arranged on a side wall of the lower sleeve corresponding to the stepped shaft 21. One end of the stepped shaft 21 is rotatably arranged in the through hole 30, and is fixedly connected to the ball valve 6 arranged in the cavity of the lower sleeve 3. The other end of the stepped shaft 21 is rotatably arranged on a side wall of the lower shell 2. The spur gear 17 is sleeved and fixed on the side wall of the stepped shaft 21, and engages with the spur rack 22. A reciprocating movement of the lower shell 2 and the movable tube 5 drives the spur rack 22 to move. The spur rack 22 then drives the spur gear 17 to rotate. A torque of the spur gear 17 is transmitted to the ball valve 6 through the stepped shaft 21, and the spur gear 17 cooperates with the stepped shaft 21 to change a rotation angle of the ball valve 6 to open and close the reservoir isolation valve.

Further, the other end of the stepped shaft 21 is limited on the side wall of the lower shell 2 through the locking screw 19. A threaded through hole 27 is provided on the side wall of the lower shell 2, and matches the locking screw 19. A connection between the stepped shaft 21 and the side wall of the lower shell 2 is provided with the second sliding bearing 20, and a connection between the stepped shaft 21 and the through hole 30 is provided with the first sliding bearing 18. The first sliding bearing 18, the second sliding bearing 20 and the stepped shaft 21 are limited through the locking screw 19.

Furthermore, a first shaft shoulder 58 is provided at a connection between the stepped shaft 21 and the spur gear 17. A second shaft shoulder 59 is provided at the connection between the stepped shaft 21 and the lower shell 2. The first sliding bearing 18 is limited at the connection between the stepped shaft 21 and the through hole 30. The second sliding bearing 20 is limited on the second shaft shoulder 59. The side wall of the stepped shaft 21 is provided with a key slot 60 for mounting the spur gear 17. An end of the stepped shaft 21 is provided with a rectangular protrusion 57 connected to the ball valve 6.

Furthermore, the spur gear 17 is fixedly connected to the stepped shaft 21 through a flat key 24.

The ball valve 6 is of a sphere-like structure equipped with a flow channel 38. The ball valve 6 is provided with two symmetrical parallel side surfaces, and each of the two side surfaces is provided with a rectangular groove 39. The rectangular protrusion 57 is fixedly connected to the rectangular groove 39. An inner diameter of a first cavity of the lower end of the lower sleeve 3 is larger than an inner diameter of a second cavity of the upper end of the lower sleeve 3. An inner wall of a connection between the first cavity and the second cavity is provided with a hemispherical structure 31 matching the ball valve 6. The second cavity is a cylinder with two parallel flat planes 33. The through hole 30 is arranged on a flat plane of the second cavity of the lower sleeve 3. The sliding groove 37 is arranged on a flat plane of the lower end of the movable tube 5.

The inner limit tube 9 and the inner bearing socket 12 are inserted in the upper sleeve 10. The inner limit tube 9 is arranged between the inner bearing socket 12 and the movable tube 5. A plurality of first sliding blocks 48 spaced apart are arranged on an inner wall of an upper end of the inner bearing socket 12 along a circumferential direction. A side wall of an upper end of the upper sleeve 10 is provided with a second sliding slot 44 corresponding to the plurality of first sliding blocks 48. The plurality of first sliding blocks 48 are movable along the second sliding slot 44, so as to limit the inner bearing socket 12 in a circumferential direction. The startup part 15 is inserted into the inner bearing socket 12, the retaining ring 13 and the upper joint 14. A third shaft shoulder 55 is provided on a side wall of the startup part 15, and the third shaft shoulder 55 abuts against the plurality of first sliding blocks 48. The third shaft shoulder 55 of the startup part 15 is configured to push the plurality of first sliding blocks 48 to axially slide in the second sliding slot 44, so as to drive the inner limit tube 9 to move.

The inner bearing socket 12 is inserted into the outer bearing socket 11. The inner limit tube 9 is inserted into the outer limit tube 23. The outer limit tube 23 and the outer bearing socket 11 abut against the movable tube 5 and the retaining ring 13. A second sliding block 43 is provided on a side wall of the inner limit tube 9. A first limit slot 61 is provided on side wall of a lower end of the outer limit tube 23. The second sliding block 43 matches the first limit slot 61. The second sliding block 43 is slidable in the first limit slot 61 and limits the outer limit tube 23 in a circumferential direction.

An upper end of the movable tube 5 is provided with a wedge-shaped limit block 35. A lower end of the inner limit tube 9 is provided with a tooth structure 42. A terminal end of the lower end of the outer limit tube 23 is provided with a third limit groove 62. The wedge-shaped limit block 35 cooperates with the tooth structure 42 that during a rotation of the inner limit tube 9, the tooth structure 42 pushes the wedge-shaped limit block 35 into the first limit slot 61 of the outer limit tube 23, so as to control a rotation of the outer limit tube 23 to realize a circumferential limit and an axial movement of the movable tube 5.

The thrust bearing 25 is arranged between an end surface of the outer limit tube 23 and an end surface of the outer bearing socket 11, and the thrust bearing 25 is also arranged between an end surface of the inner limit tube 9 and the inner bearing socket 12, so as to realize an axial limit.

The hemispherical structure 31 of the lower sleeve 3, an end surface of the lower sleeve 3 in contact with the lower joint 1, and an inner wall of the movable tube 5 in contact with the lower sleeve 3 are all provided with a seal groove 32. A first annular groove 47 is provided on an inner wall of a lower end of the outer bearing socket 11, and a second annular groove 46 is provided on an end surface of an upper end of the outer bearing socket 11. An inner wall of the lower end of the inner bearing socket 12 is provided with a mounting groove 49. The seal ring 16 is arranged in the seal groove 32, the first annular groove 47, the second annular groove 46 and the mounting groove 49 to realize a sealing function.

An inner wall of an upper end of the upper joint 14 is of a circular truncated cone-shaped structure 53 with an inner diameter increasing from bottom to top. An internal thread of the upper end of the upper joint 14 is arranged on the circular truncated cone-shaped structure 53, and the circular truncated cone-shaped structure 53 is connected to a pipe string.

A working principle of the reservoir isolation valve for the secondary completion provided herein is described as follows.

Figure 2:
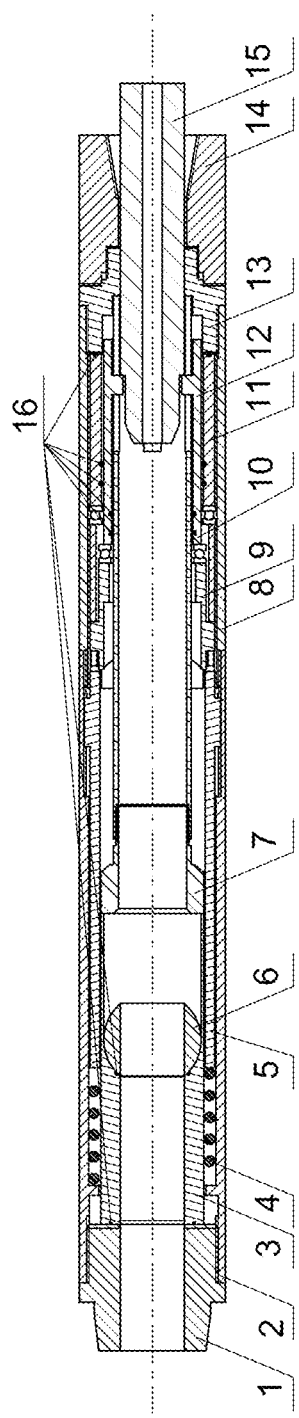
FIG. 2 is a cross-sectional view of the reservoir isolation valve along an A-A direction in FIG. 1, and schematically depicts an open state of the reservoir isolation valve according to an embodiment of the present disclosure.
Figure 3:
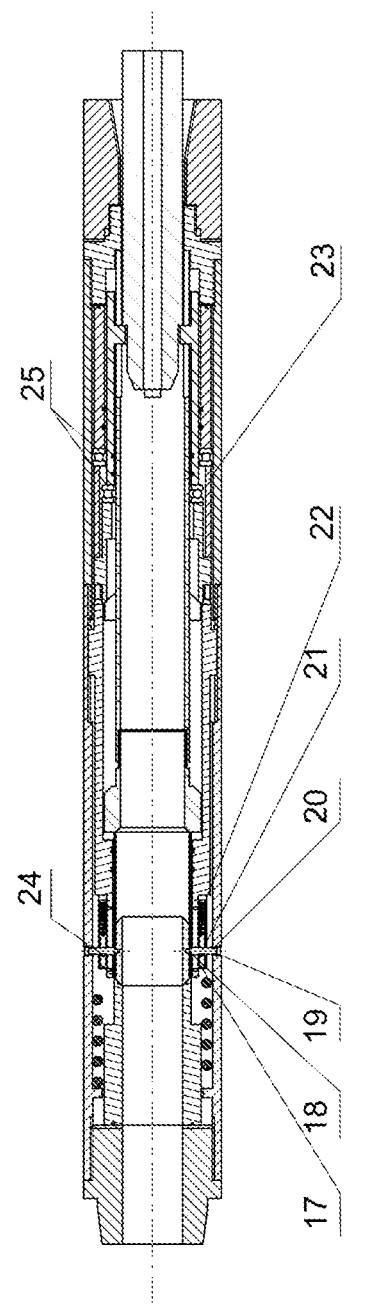
FIG. 3 is a cross-sectional view of the reservoir isolation valve along a B-B direction in FIG. 1, and schematically depicts another open state of the reservoir isolation valve according to an embodiment of the present disclosure.
Figure 4:
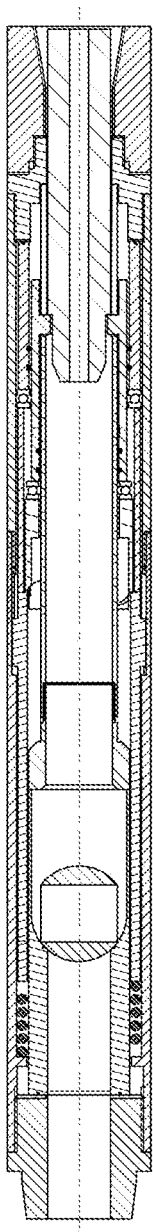
FIG. 4 is a cross-sectional view of the reservoir isolation valve along the A-A direction in FIG. 1, and schematically depicts a closed state of the reservoir isolation valve according to an embodiment of the present disclosure.
Figure 5:
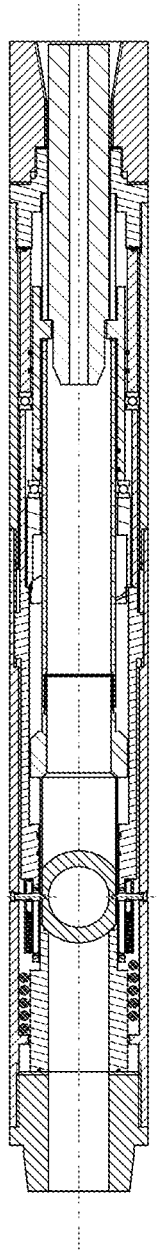
FIG. 5 is a cross-sectional view of the reservoir isolation valve along the B-B direction in FIG. 1, and schematically depicts another closed state of the reservoir isolation valve according to an embodiment of the present disclosure.
Figure 6:
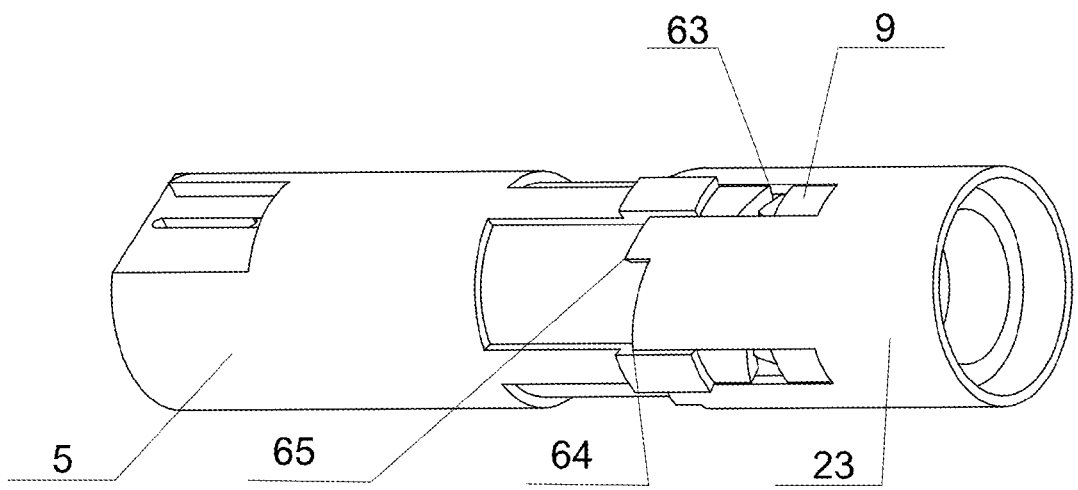
FIG. 6 partially depicts a structure of the reservoir isolation valve in the closed state according to an embodiment of the present disclosure.
Figure 7:
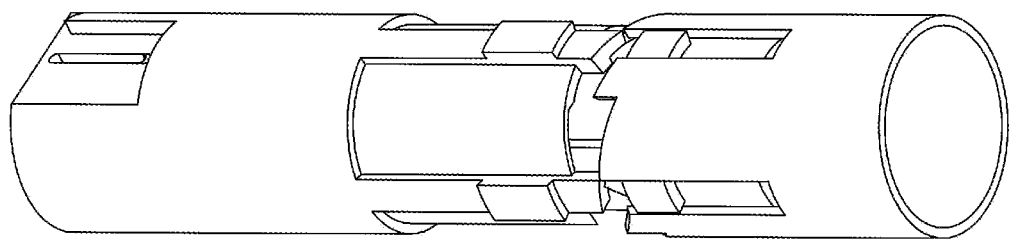
FIG. 7 partially depicts an intermediate state of the structure of the reservoir isolation valve when the reservoir isolation valve is opened or closed according to an embodiment of the present disclosure.
Figure 8:
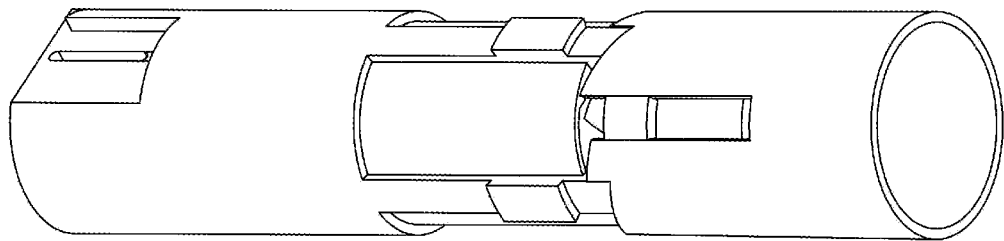
FIG. 8 partially depicts the structure of the reservoir isolation valve in the open state according to an embodiment of the present disclosure.
Figure 9:
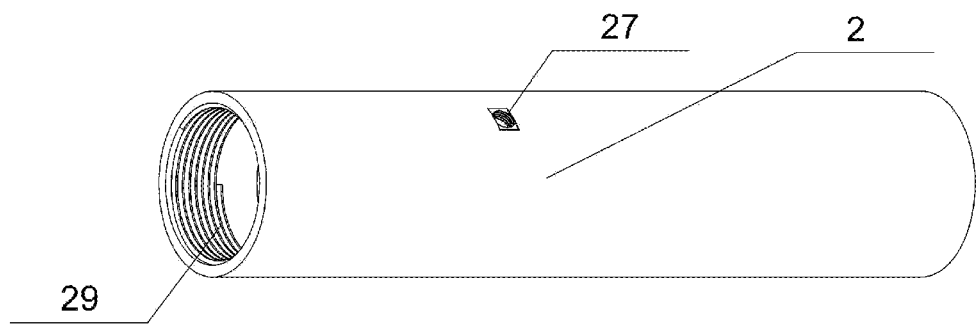
FIG. 9 schematically depicts a structure of a lower shell according to an embodiment of the present disclosure.
Figure 10:
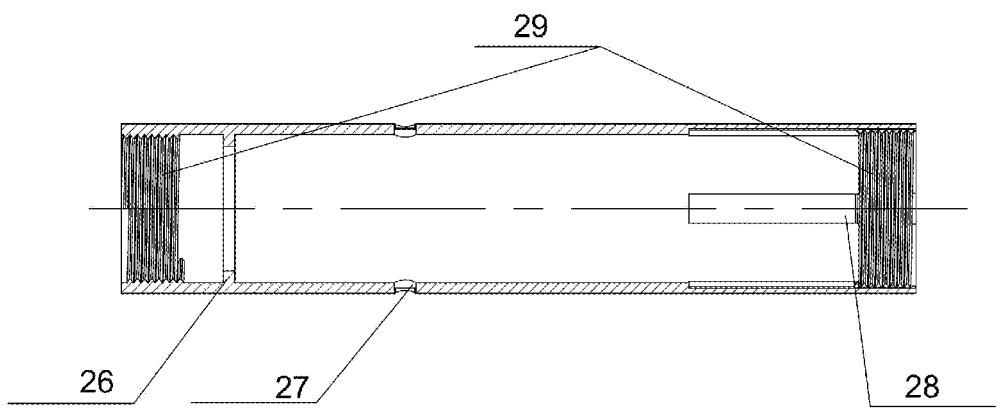
FIG. 10 is a cross-sectional view of the lower shell according to an embodiment of the present disclosure.
Figure 11:
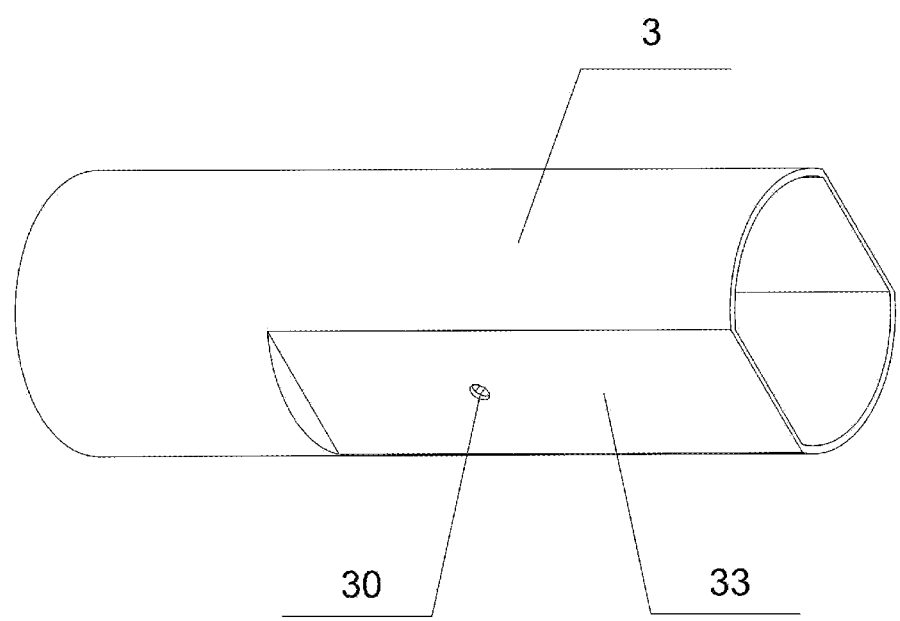
FIG. 11 schematically depicts a structure of a lower sleeve according to an embodiment of the present disclosure.
Figure 12:
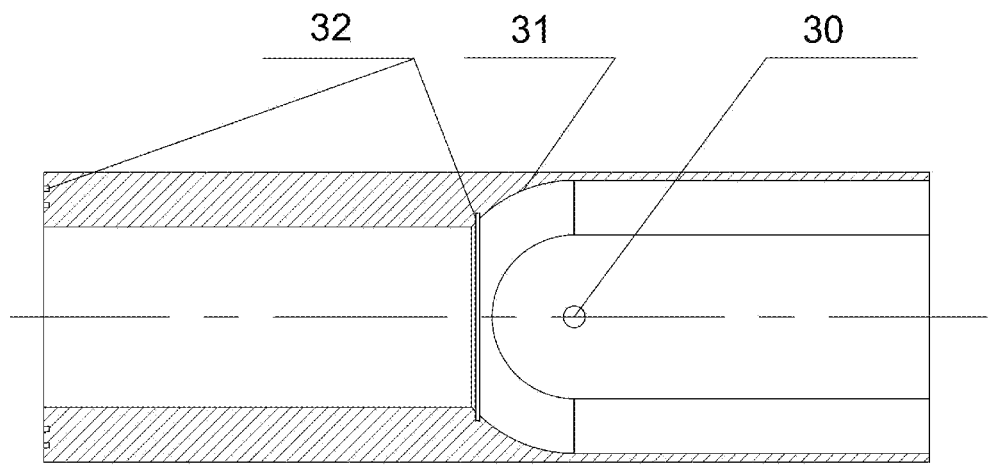
FIG. 12 is a cross-sectional view of the lower sleeve according to an embodiment of the present disclosure.
Figure 13:
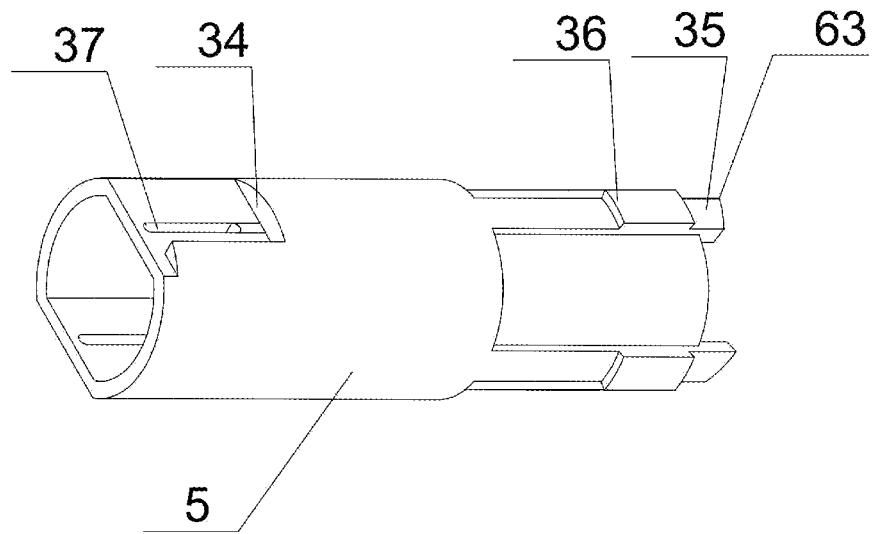
FIG. 13 schematically depicts a structure of a movable tube according to an embodiment of the present disclosure.
Figure 14:
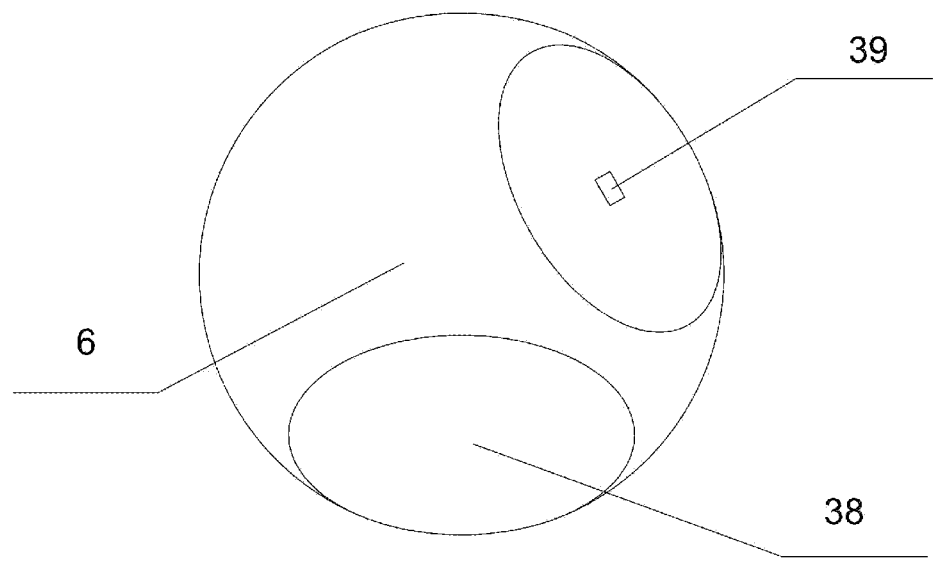
FIG. 14 schematically depicts a structure of a ball valve according to an embodiment of the present disclosure.
Figure 15:
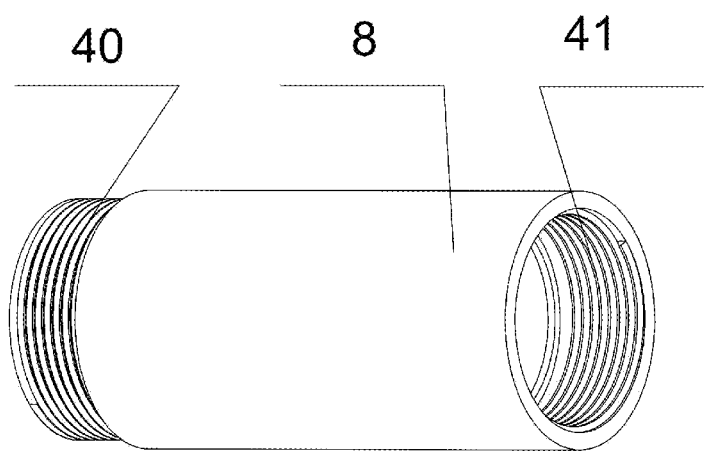
FIG. 15 schematically depicts a structure of a second shell according to an embodiment of the present disclosure.
Figure 16:
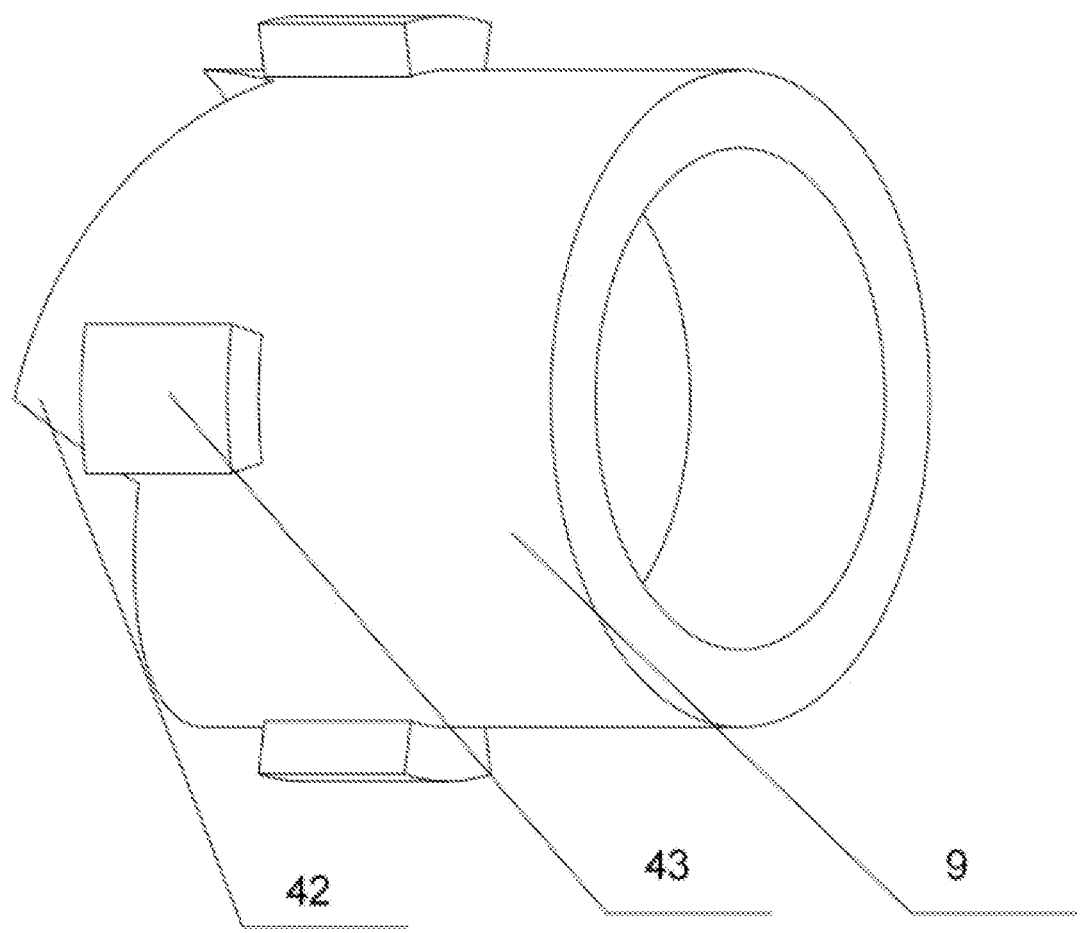
FIG. 16 schematically depicts a structure of an inner limit tube according to an embodiment of the present disclosure.
Figure 17:
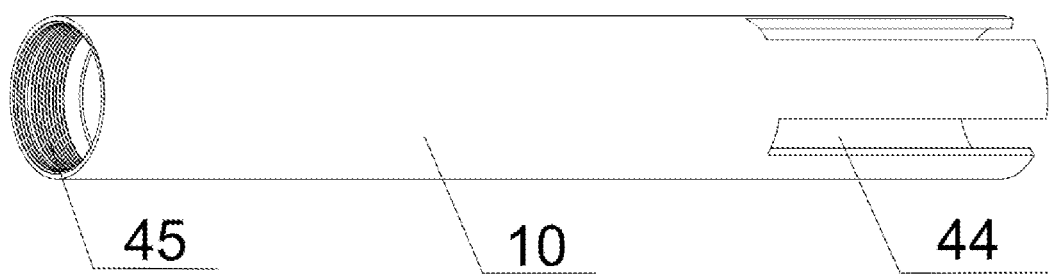
FIG. 17 schematically depicts a structure of an upper sleeve according to an embodiment of the present disclosure.
Figure 18:
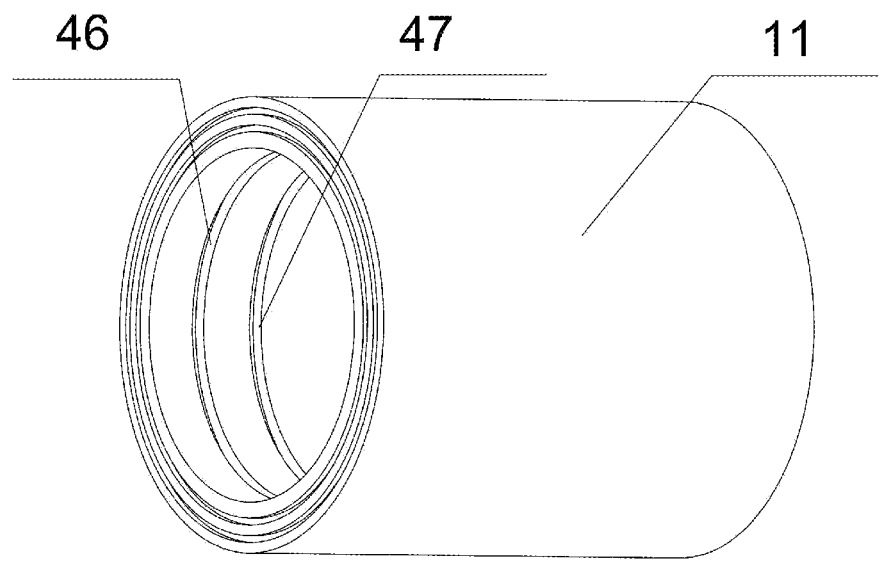
FIG. 18 schematically depicts a structure of an outer bearing socket according to an embodiment of the present disclosure.
Figure 19:
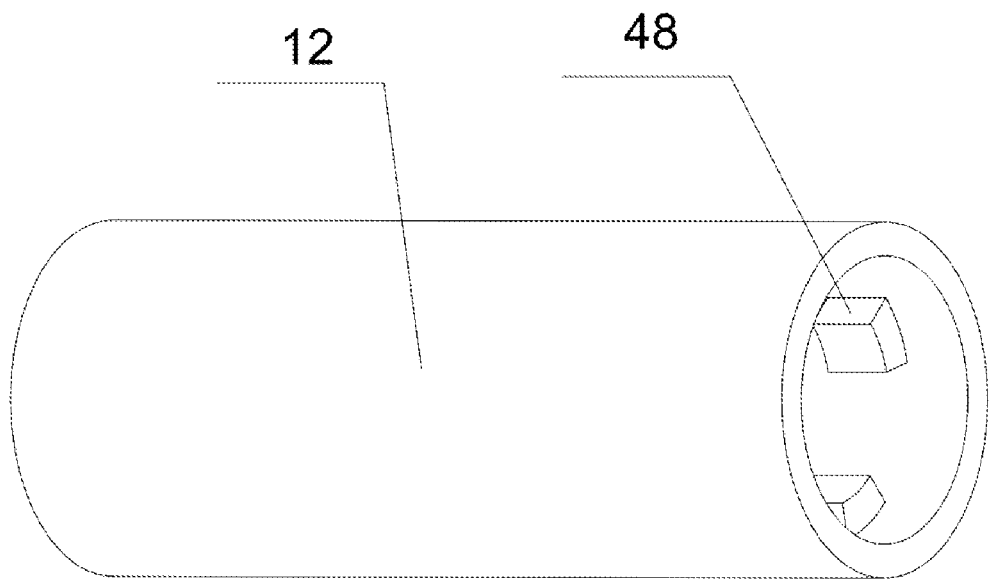
FIG. 19 schematically depicts a structure of an inner bearing socket according to an embodiment of the present disclosure.
Figure 20:
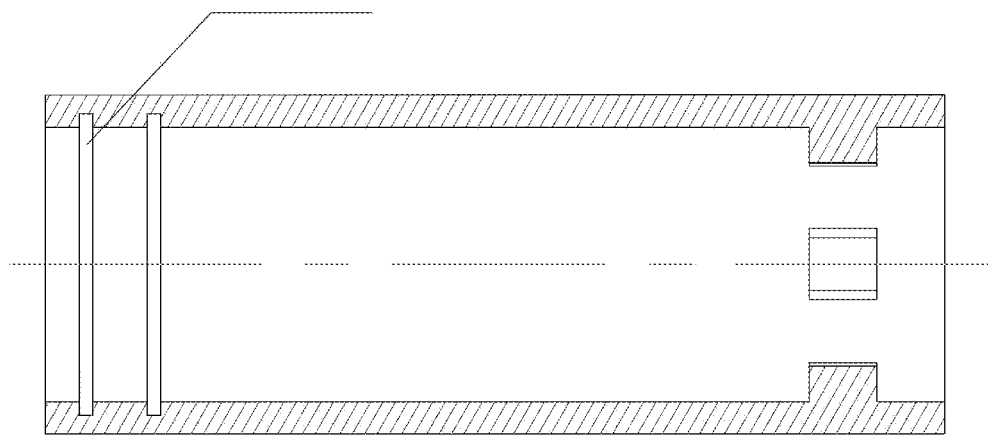
FIG. 20 is a cross-sectional view of the inner bearing socket according to an embodiment of the present disclosure.
Figure 21:
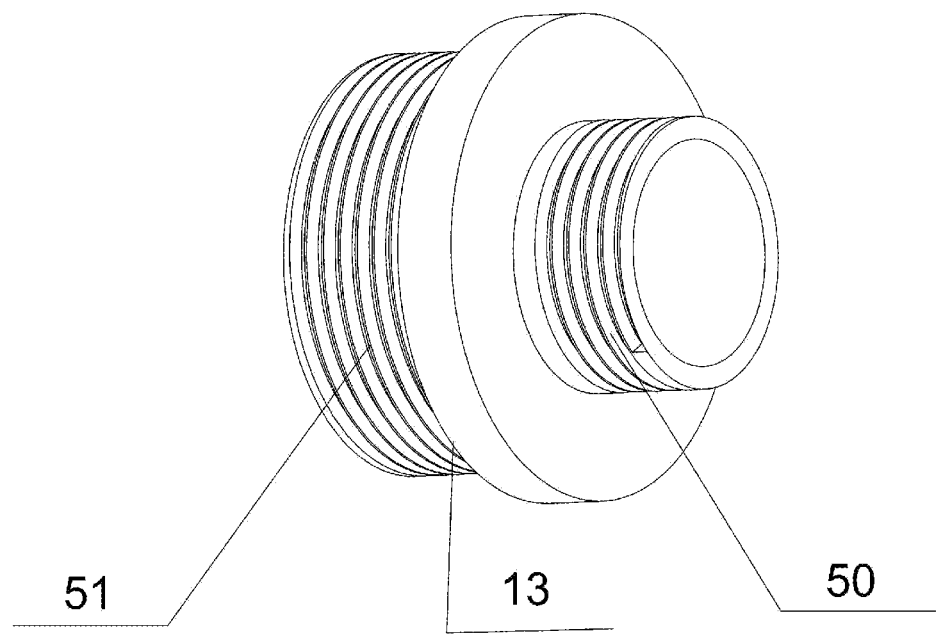
FIG. 21 schematically depicts a structure of a retaining ring according to an embodiment of the present disclosure.
Figure 22:
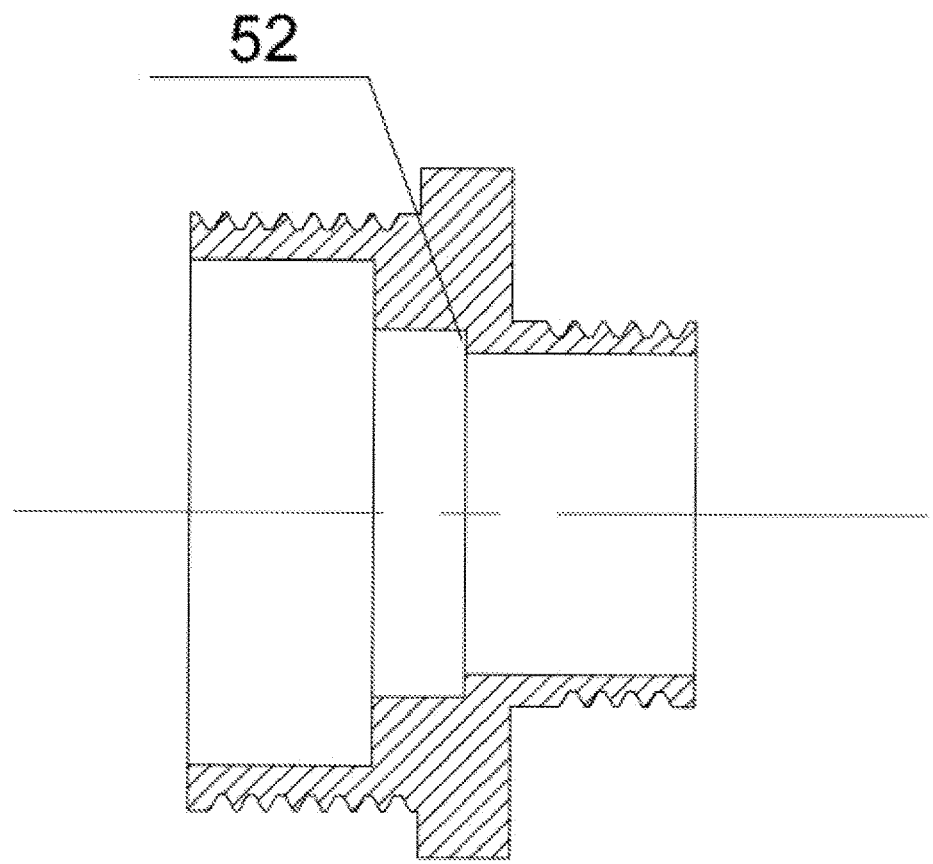
FIG. 22 is a cross-sectional view of the retaining ring according to an embodiment of the present disclosure.
Figure 23:
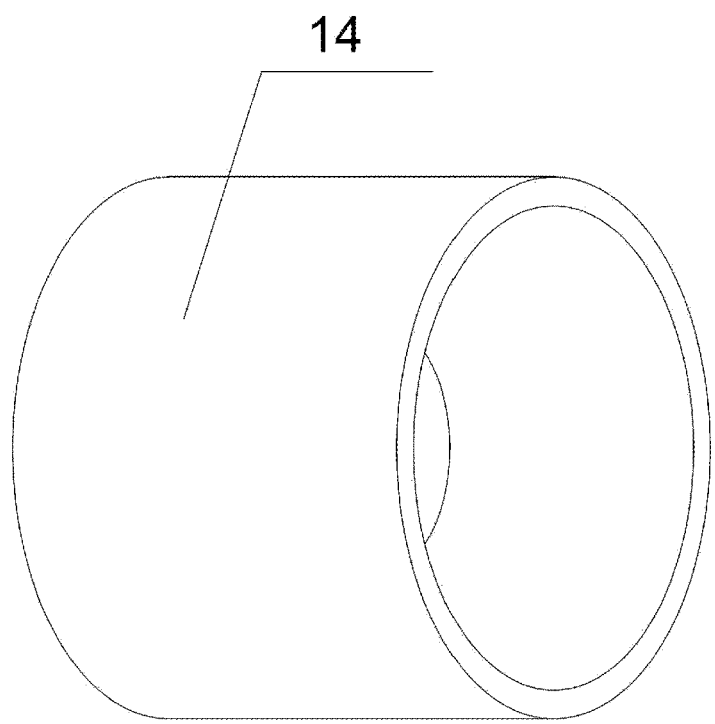
FIG. 23 schematically depicts a structure of a second joint according to an embodiment of the present disclosure.
Figure 24:
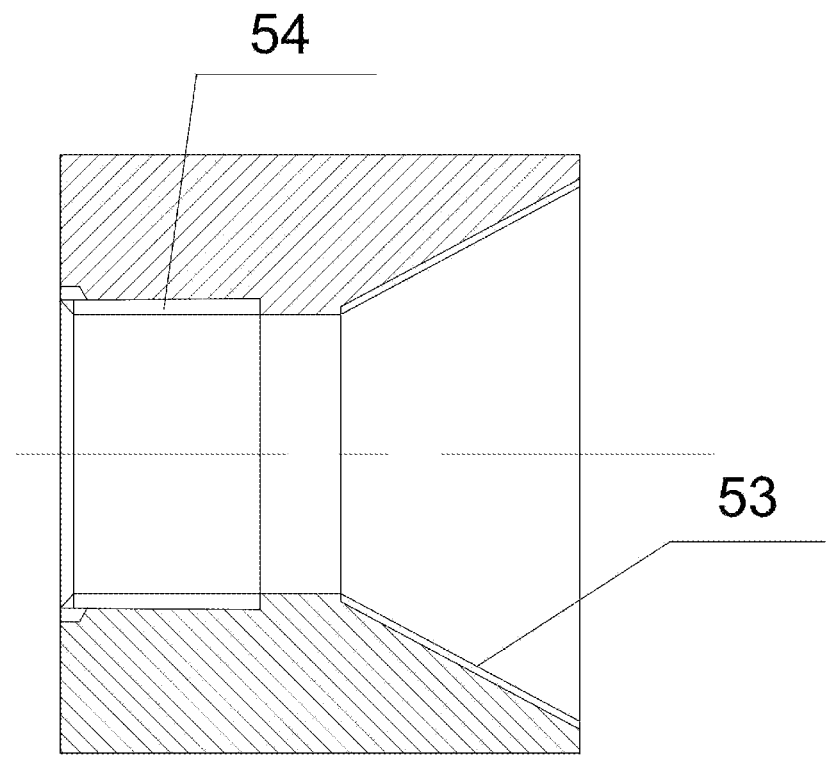
FIG. 24 is a cross-sectional view of the second joint according to an embodiment of the present disclosure.
Figure 25:
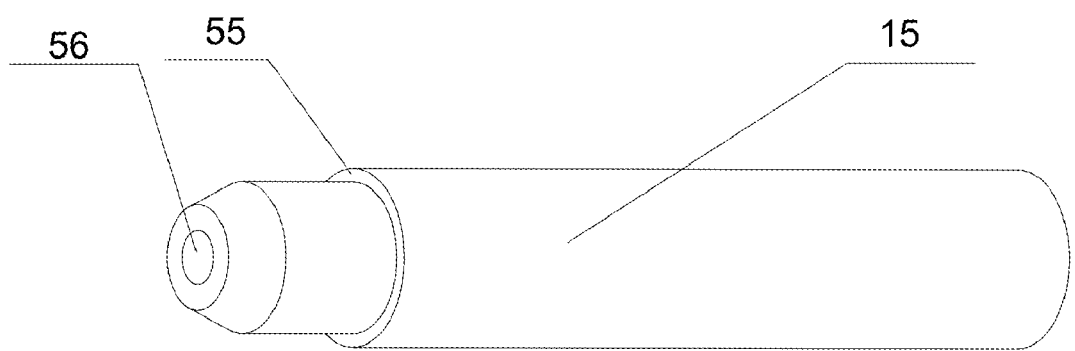
FIG. 25 schematically depicts a structure of a startup part according to an embodiment of the present disclosure.
Figure 26:
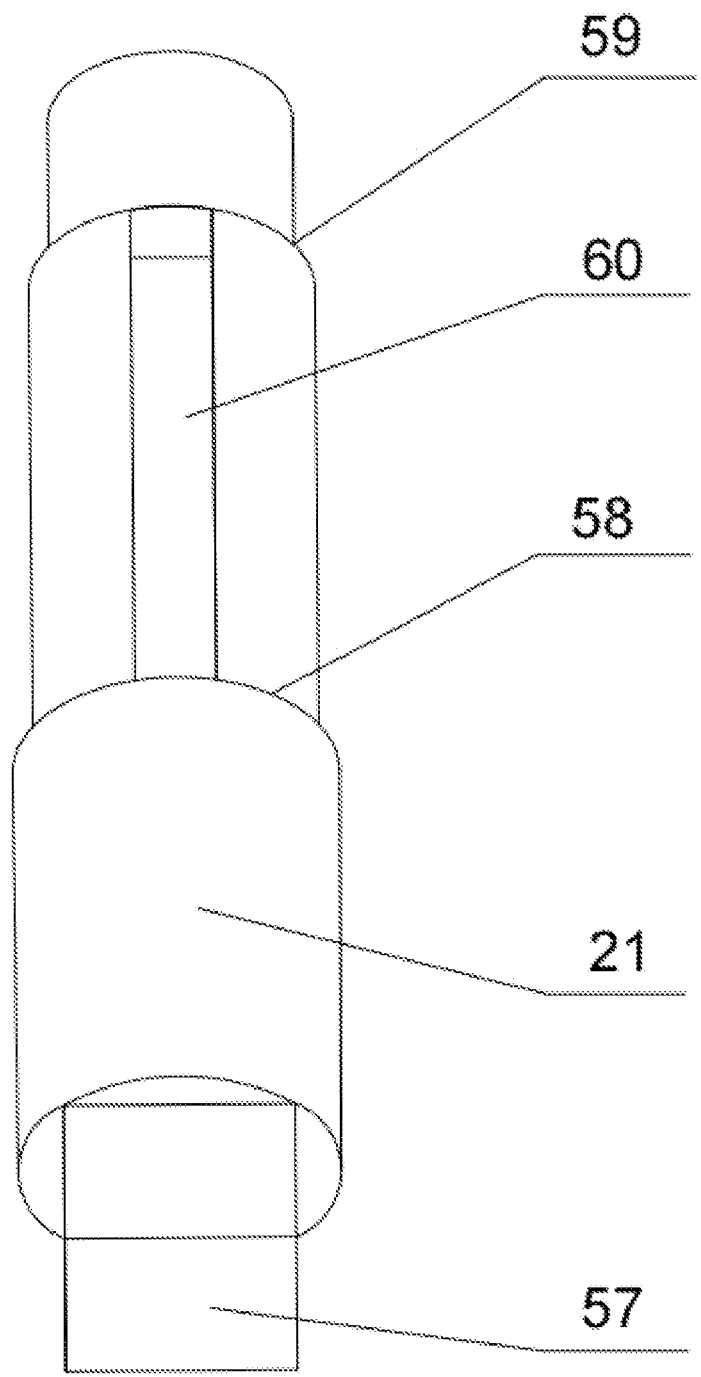
FIG. 26 schematically depicts a structure of a stepped shaft according to an embodiment of the present disclosure.
Figure 27:
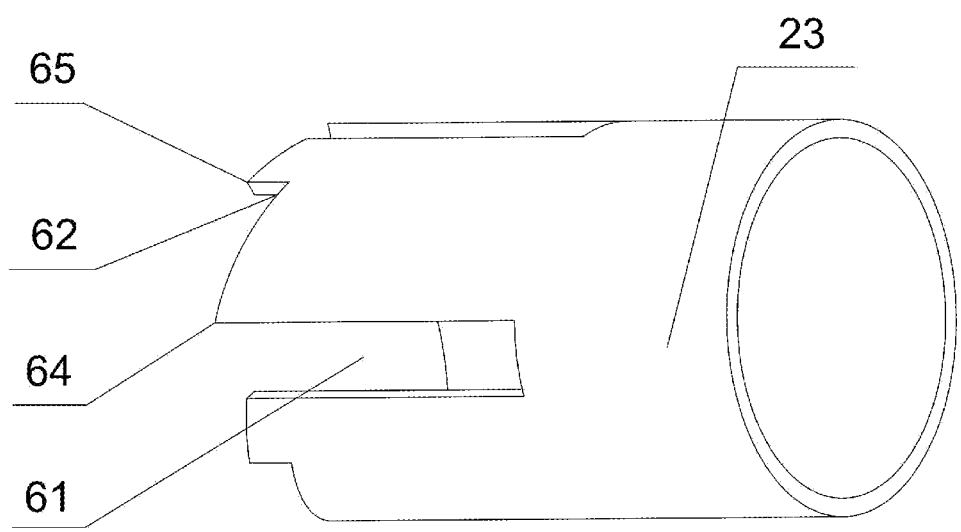
FIG. 27 schematically depicts a structure of an outer limit tube according to an embodiment of the present disclosure.

When in use, the reservoir isolation valve is lowered to a designated position through a pipe string. At this time, the reservoir isolation valve is in an open state as shown in FIGS. 2-3 and 8. When the reservoir isolation valve has been placed in the designated position, a packer connected to an upper part of the reservoir isolation valve starts to work, and the s reservoir isolation valve is fixed in a wellbore. At this time, the reservoir isolation valve needs to be closed.

When the reservoir isolation valve is in the open state, the wedge-shaped limit block 35 of the movable tube 5 is limited between the third limit slot 62 of the outer limit tube 23 and the tooth structure 42 of the inner limit tube 9.

When the reservoir isolation valve is closed, the startup part 15 is lowered until the third shaft shoulder 55 of the startup part 15 is in contact with the first sliding block 48 of the inner bearing socket 12, so as to pushes the inner bearing socket 12 to slide down along the second sliding slot 44 of the upper sleeve 10.

The inner bearing socket 12 pushes the thrust bearing 25, and the thrust bearing 25 pushes the inner limit tube 9. The tooth structure 42 on the inner limit tube 9 pushes an upper end surface of the movable tube 5, such that the protrusion 36 of the movable tube 5 moves along the second limit slot 28 of the lower shell 2. When a vertex position 63 of the wedge-shaped limiting block 35 in the movable tube 5 exceeds a vertex 65 of the third limit slot 62 in the outer limit tube 23, and an inclined surface of the wedge-shaped limiting block 35 in the movable tube 5 exceeds an inclined surface of the third limit slot 62 of the outer limit tube 23, the startup part 15 is taken out. At this time, under an elastic force of the reset spring 4, the wedge-shaped limit block 35 on the movable sleeve 5 pushes the inner limit tube 9 and the inclined surface of the wedge-shaped limiting block 35 to move along the tooth structure 42 and the inclined surface of the third limit slot 62, so as to generate a circumferential force to the inner limit tube 9 and the outer limit tube 23 to allow the inner limit tube 9 and the outer limit tube 23 to rotate together. The wedge-shaped limit block 35 of the movable tube 5 then slides into the first limit slot 61 of the outer limit tube 23. At this time, the movable tube 5 moves towards the inner limit tube 9, and the spur rack 22 fixed on the movable tube 5 moves with the movable tube 5, driving the spur gear 17 to rotate by 90° through meshing. Since the ball valve 6 and the spur gear 17 can rotate coaxially through the stepped shaft 21, the ball valve 6 also rotates by 90° at this time, and the reservoir isolation valve changes into a closed state shown in FIGS. 4-6. The reservoir isolation valve stops working.

When the reservoir isolation valve needs to be opened again after the operation is completed, the startup part 15 until the third shaft shoulder 55 of the startup part 15 is in contact with the first sliding block 48 of the inner bearing socket 12, so as to pushes the inner bearing socket 12 to slide down. The inner bearing socket 12 pushes the thrust bearing 25, and the thrust bearing 25 pushes the inner limit tube 9. The tooth structure 42 on the inner limit tube 9 pushes the wedge-shaped limit block 35 of the movable tube 5 towards the lower joint 1. When the vertex position 63 of the wedge-shaped limiting block 35 in the movable tube 5 exceeds an end point 64 of the third limit slot 62 in the outer limit tube 23, and the inclined surface of the wedge-shaped limiting block 35 in the movable tube 5 exceeds the inclined surface of the third limit slot 62 of the outer limit tube 23, the startup part 15 is taken out. At this time, under the elastic force of the reset spring 4, the wedge-shaped limit block 35 on the movable sleeve 5 generates a circumferential force to the inner limit tube 9 and the outer limit tube 23 to allow the inner limit tube 9 and the outer limit tube 23 to rotate together. The wedge-shaped limit block 35 of the movable tube 5 then slides into the first limit slot 61 of the outer limit tube 23. At this time, the spur rack 22 fixed on the movable tube 5 moves drives the spur gear 17 to rotate reversely by 90°. Since the ball valve 6 and the spur gear 17 can rotate coaxially through the stepped shaft 21, the ball valve 6 also rotates reversely by 90° at this time, and the reservoir isolation valve changes into the open state. The reservoir isolation valve starts working.

The described above is preferred embodiments, and not intended to limit the present disclosure. Obviously, modifications and replacements made by those skilled in the art without departing from the spirit of this disclosure should fall within the scope of the present disclosure defined by appended claims.

What is claimed is:

1. A reservoir isolation valve for a secondary completion, comprising:
   a shell assembly;
   a sleeve assembly arranged in the shell assembly;
   a reset spring arranged between the shell assembly and the sleeve assembly;
   a movable tube;
   an inner limit tube;
   an outer limit tube;
   an outer bearing socket;
   an inner bearing socket;
   a thrust bearing;
   a ball valve arranged in the sleeve assembly;
   a stepped shaft fixed on the ball valve;
   a transmission mechanism configured for connecting the movable tube to the stepped shaft and allowing the stepped shaft to rotate; and
   a startup part;

wherein the shell assembly and the sleeve assembly are both provided with a through cavity; two ends of the sleeve assembly are limited in two ends of the shell assembly, respectively; a through channel is arranged in the startup part; the shell assembly, the sleeve assembly, the startup part and the ball valve are arranged coaxially; an inner wall of an upper end of the shell assembly is of a circular truncated cone-shaped structure with an inner diameter increasing from a bottom portion to a top portion; the circular truncated cone-shaped structure is provided with an internal thread; part of an inner wall of the through cavity of the sleeve assembly is spherical; the ball valve abuts against the spherical inner wall of the through cavity of the sleeve assembly; the ball valve is a sphere with four perpendicular planes; and centers of the four perpendicular planes are on the same circle;
   one end of the stepped shaft passes through a side wall of the sleeve assembly and is rotatably connected to the side wall of the sleeve assembly; the end of the stepped shaft is fixed on the ball valve; and the other end of the stepped shaft is rotatably arranged on an inner wall of the shell assembly;
   two ends of the reset spring are limited between the inner wall of the shell assembly and a lower end surface of the movable tube; the movable tube, the inner limit tube and the inner bearing socket are sequentially sleeved on the sleeve assembly; an upper end of the movable tube faces a lower end of the inner limit tube; an upper end of the inner limit tube is connected to a lower end of the inner bearing socket through the thrust bearing; an upper end of the inner bearing socket is limited on the inner wall of the shell assembly; the inner bearing socket is slidably along the sleeve assembly; an inner wall of the inner bearing socket is provided with a first sliding block; a side wall of the startup part is provided with a first shaft shoulder; the startup part is inserted into an upper end of the sleeve assembly; and the first shaft shoulder abuts against the first sliding block of the inner bearing socket;
   the outer limit tube and the outer bearing socket are sleeved on the inner limit tube and the inner bearing socket; a lower end of the outer limit tube is limited on the upper end of the movable tube; the outer bearing socket is limited on the inner wall of the shell assembly; and the outer limit tube is connected to the outer bearing socket through the thrust bearing;
   an inner diameter of the sleeve assembly below the ball valve is smaller than an inner diameter of the sleeve assembly above the ball valve; part of an inner wall of the sleeve assembly provided with the ball valve is of a hemispherical structure matching the ball valve; a cavity of a connection between the sleeve assembly and the movable tube is a cylinder with two parallel planes;
   a side wall of the upper end of the movable tube is provided with a protrusion;
   the inner wall of the shell assembly is provided with a first limit slot matching the protrusion; the protrusion is slidable along the first limit slot; the movable tube is in clearance fit with the sleeve assembly; a side wall of a lower end of the movable tube is provided with a sliding slot; the stepped shaft is inserted into the sliding slot; and the stepped shaft is movable along the sliding slot;
   the upper end of the movable tube is provided with a wedge-shaped limit block corresponding to the protrusion; the inner limit tube is sleeved on the sleeve assembly; the lower end of the inner limit tube is provided with a tooth structure matching the wedge-shaped limit block; the outer limit tube is sleeved on the inner limit tube; a terminal end of the lower end of the outer limit tube is provided with a second limit slot matching the wedge-shaped limit block; a side wall of the lower end of the outer limit tube is provided with a third limit slot; a side wall of the inner limit tube is provided with a second sliding block matching the third limit slot; and the second sliding block is slidable in the third limit slot;

when the reservoir isolation valve is in a closed state, the wedge-shaped limit block of the movable tube and the second sliding block of the inner limit tube are both in the third limit slot of the outer limit tube; and when the reservoir isolation valve is in an open state, the wedge-shaped limit block of the movable tube is limited in the second limit slot; and the second sliding block of the inner limit tube is in the third limit slot of the outer limit tube.

2. The reservoir isolation valve of claim 1, wherein the transmission mechanism comprises a spur rack and a spur gear; and a welding surface is provided on the side wall of the lower end of the movable tube; a first sliding slot is arranged between the welding surface and the lower end surface of the movable tube; the spur rack is arranged on the welding surface; the spur gear is fixed on a side wall of the stepped shaft; and the spur gear is engaged with the spur rack.

3. The reservoir isolation valve of claim 2, wherein a connection between the stepped shaft and the spur gear is provided with a second shaft shoulder; and a connection between the stepped shaft and a lower shell of the shell assembly is provided with a third shaft shoulder; and a connection between the stepped shaft and a lower sleeve of the sleeve assembly is provided with a first sliding bearing; and a connection between the stepped shaft and the lower shell of is provided with a second sliding bearing.

4. The reservoir isolation valve of claim 2, wherein the side wall of the stepped shaft is provided with a key slot configured for mounting the spur gear; and the spur gear is fixedly connected to the stepped shaft through a flat key and the key slot.

5. The reservoir isolation valve of claim 2, wherein a rectangular slot is arranged on one of the four perpendicular planes of the ball valve; the end of the stepped shaft is provided with a rectangular protrusion; and the rectangular protrusion is connected to the rectangular slot of the ball valve.

6. The reservoir isolation valve of claim 2, wherein the shell assembly comprises a lower joint, a lower shell, a second shell, a retaining ring and a second joint;

wherein the lower joint, the lower shell, the second shell, the retaining ring and the second joint are threadedly connected in sequence; the lower joint, the lower shell, the second shell, the retaining ring and the second joint are arranged coaxially; and the lower joint, the lower shell, the second shell, the retaining ring and the second joint are all provided with a through cavity;

an inner wall of an upper end of the lower shell is provided with the first limit slot; an inner wall of a lower end of the lower shell is provided with a raised ring; the reset spring is arranged between the lower end surface of the movable tube and the raised ring; a side wall of the lower shell is provided with a threaded through hole corresponding to the stepped shaft; and a locking screw is threadedly connected in the threaded through hole; and an inner wall of the retaining ring is provided with a first positioning step and a second positioning step; a terminal end of the upper end of the inner bearing socket matches the first positioning step; and the upper end of the sleeve assembly abuts against the second positioning step.

7. The reservoir isolation valve of claim 6, wherein the sleeve assembly comprises a lower sleeve, a connecting part and an upper sleeve;

wherein the lower sleeve, the connecting part and the upper sleeve are connected in sequence; and the lower sleeve and the connecting part are arranged in the through cavity of the lower shell; the lower sleeve, the connecting part and the upper sleeve are arranged coaxially; the lower sleeve, the connecting part and the upper sleeve all provided with a through cavity; the upper sleeve is arranged in the through cavities of the lower shell and the second shell; a lower end of the lower sleeve and an upper end of the upper sleeve abut against an upper end of the lower joint and the second positioning step of the retaining ring, respectively; a lower end of the connecting part abuts against an upper end of the lower sleeve; and an upper end of the connecting part is threadedly connected to a lower end of the upper sleeve;

the upper sleeve is inserted into the inner limit tube and the inner bearing socket;

the movable tube is arranged in a gap between the lower sleeve, the connecting part, the upper sleeve and the lower shell; and the movable tube forms a clearance fit with the lower sleeve;

an inner diameter of a first cavity of the lower end of the lower sleeve is larger than an inner diameter of a second cavity of the upper end of the lower sleeve; an inner wall of a connection between the first cavity and the second cavity is provided with a hemispherical structure matching the ball valve; the second cavity is a cylinder with two parallel flat planes; a flat plane of the second cavity of the lower sleeve is provided with a through hole matching the stepped shaft; the stepped shaft passes through the through hole; a first limiting bear is limit at a connection between the stepped shaft and the through hole; and the lower end of the movable tube is provided with a cavity matching the second cavity of the lower sleeve; and a side wall of the upper end of the upper sleeve is provided with a second sliding slot matching the first sliding block; and the first sliding block is movable in the second sliding slot.

8. The reservoir isolation valve of claim 7, wherein the upper end of the lower joint and a lower end of the second shell are both provided with an external thread; both ends of the lower shell are provided with an internal thread matching the lower joint and the second shell, respectively; an upper end of the second shell and a lower end of the second joint are both provided with an internal thread; both ends of the retaining ring are provided with an external thread to match the internal thread of the second shell and the internal thread of the second joint, respectively; and an inner wall of an upper end of the second joint of a circular truncated cone-shaped structure; and the upper end of the connecting part is provided with an external thread; and the lower end of the upper sleeve is provided with an internal thread matching the external thread of the connecting part.

9. The reservoir isolation valve of claim 7, wherein the hemispherical structure of the lower sleeve, an end surface of the lower sleeve in contact with the lower joint, and an inner wall of the movable tube in contact with the lower sleeve are all provided with a seal sleeve; a first annular groove is provided on an inner wall of a lower end of the outer bearing socket; a second annular groove is provided on an end surface of an upper end of the outer bearing socket; an inner wall of the lower end of the inner bearing socket is provided with a mounting groove; and the seal sleeve, the first annular groove, the second annular groove and the mounting groove are all provided with a seal ring.

* * * * *